US012713228B2

(12) United States Patent
Saha et al.

(10) Patent No.: US 12,713,228 B2
(45) Date of Patent: Aug. 18, 2026

(54) USER EQUIPMENT ANTENNA CAPABILITY INDICATION

(71) Applicant: QUALCOMM Incorporated, San Diego, CA (US)

(72) Inventors: Chiranjib Saha, San Diego, CA (US); Alberto Rico Alvarino, San Diego, CA (US); Umesh Phuyal, San Diego, CA (US); Le Liu, San Jose, CA (US); Kazuki Takeda, Minato-ku (JP); Peter Gaal, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 388 days.

(21) Appl. No.: 18/175,065

(22) Filed: Feb. 27, 2023

(65) Prior Publication Data

US 2023/0284010 A1 Sep. 7, 2023

Related U.S. Application Data

(60) Provisional application No. 63/268,884, filed on Mar. 4, 2022.

(51) Int. Cl.
*H04W 8/22* (2009.01)

(52) U.S. Cl.
CPC .................................... *H04W 8/22* (2013.01)

(58) Field of Classification Search
CPC ........ H04W 8/22; H04W 8/24; H04B 7/0608; H04B 7/0825; H04B 7/0404
See application file for complete search history.

(56) References Cited

U.S. PATENT DOCUMENTS 10,855,351 B1 * 12/2020 Tsai ........................ H04B 7/063
2004/0192203 A1 * 9/2004 Dacosta ................ H04W 16/24 455/25
2007/0210956 A1 * 9/2007 Hillis .................. H01Q 3/2676 342/179
2016/0056523 A1 * 2/2016 Olsson .................. H04B 17/12 342/359
2016/0255604 A1 * 9/2016 Venkatraman ...... G01S 5/02524 455/456.1
2018/0063693 A1 3/2018 Chakraborty et al.
2018/0309526 A1 * 10/2018 Zhang .................. H04B 17/327
2019/0098511 A1 * 3/2019 Ramamurthi ......... H04W 64/00
2019/0150004 A1 * 5/2019 Buel ..................... H04W 16/28 370/310
2019/0260485 A1 * 8/2019 Byun ...................... H04W 4/40
(Continued)

OTHER PUBLICATIONS

Nokia (Moderator): "New WID on NR Support for UAV (Uncrewed Aerial Vehicles)", 3GPP TSG RAN Meeting #94e, RP-213600, Electronic Meeting, Dec. 6-17, 2021, 5 Pages.
(Continued)

*Primary Examiner* — Kenny S Lin
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, a UE capability information request message. The UE may transmit, to the network entity in response to the UE capability information request message, a UE capability information message indicating one or more antenna capabilities of the UE. Numerous other aspects are described.

30 Claims, 11 Drawing Sheets

(56) References Cited

U.S. PATENT DOCUMENTS

| | | | | |
|---|---|---|---|---|
| 2020/0136711 | A1* | 4/2020 | Cao | H04B 7/0626 |
| 2020/0229175 | A1 | 7/2020 | Li et al. | |
| 2020/0267536 | A1* | 8/2020 | Zhou | H04B 7/0404 |
| 2020/0328785 | A1* | 10/2020 | Lee | H04B 7/0482 |
| 2021/0234586 | A1* | 7/2021 | Raghavan | H04B 7/0691 |
| 2022/0029697 | A1* | 1/2022 | Bakr | H04B 7/18506 |
| 2022/0039115 | A1* | 2/2022 | Sun | H04W 72/54 |
| 2022/0060302 | A1* | 2/2022 | Zhang | H04W 76/19 |
| 2022/0131575 | A1* | 4/2022 | Zhou | H04B 7/088 |
| 2023/0111063 | A1* | 4/2023 | Ji | H04L 5/0012 370/329 |
| 2023/0178890 | A1* | 6/2023 | Kulkarni | H01Q 3/36 343/700 R |

OTHER PUBLICATIONS

International Search Report and Written Opinion—PCT/US2023/014073—ISA/EPO—May 16, 2023.

* cited by examiner

600

900

USER EQUIPMENT ANTENNA CAPABILITY INDICATION

CROSS-REFERENCE TO RELATED APPLICATION

This patent application claims priority to U.S. Provisional Patent Application No. 63/268,884, filed on Mar. 4, 2022, entitled "USER EQUIPMENT ANTENNA CAPABILITY INDICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment antenna capability indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving, from a network entity, a UE capability information request message. The method may include transmitting, to the network entity in response to the UE capability information request message, a UE capability information message indicating one or more antenna capabilities of the UE.

Some aspects described herein relate to a method of wireless communication performed by an apparatus of a network entity. The method may include transmitting a UE capability information request message for a UE. The method may include receiving, in response to the UE capability information request message, a UE capability information message indicating one or more antenna capabilities of the UE.

Some aspects described herein relate to an apparatus for wireless communication at a UE. The apparatus may include a memory and one or more processors coupled to the memory. The one or more processors may be configured to receive, from a network entity, a UE capability information request message. The one or more processors may be configured to transmit, to the network entity in response to the UE capability information request message, a UE capability information message indicating one or more antenna capabilities of the UE.

Some aspects described herein relate to an apparatus for wireless communication at a network entity. The apparatus may include a memory and one or more processors coupled to the memory. The one or more processors may be configured to transmit a UE capability information request message for a UE. The one or more processors may be configured to receive, in response to the UE capability information request message, a UE capability information message indicating one or more antenna capabilities of the UE.

Some aspects described herein relate to a non-transitory computer-readable medium that stores a set of instructions for wireless communication by a UE. The set of instructions, when executed by one or more processors of the UE, may cause the UE to receive, from a network entity, a UE capability information request message. The set of instructions, when executed by one or more processors of the UE, may cause the UE to transmit, to the network entity in response to the UE capability information request message, a UE capability information message indicating one or more antenna capabilities of the UE.

Some aspects described herein relate to a non-transitory computer-readable medium that stores a set of instructions for wireless communication by a network entity. The set of instructions, when executed by one or more processors of the network entity, may cause the network entity to transmit a UE capability information request message for a UE. The set of instructions, when executed by one or more processors of the network entity, may cause the network entity to receive, in response to the UE capability information request message, a UE capability information message indicating one or more antenna capabilities of the UE.

Some aspects described herein relate to an apparatus for wireless communication. The apparatus may include means for receiving, from a network entity, a UE capability information request message. The apparatus may include means for transmitting, to the network entity in response to the UE capability information request message, a UE capability information message indicating one or more antenna capabilities of the UE.

Some aspects described herein relate to an apparatus for wireless communication. The apparatus may include means for transmitting a UE capability information request message for a UE. The apparatus may include means for receiving, in response to the UE capability information request message, a UE capability information message indicating one or more antenna capabilities of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
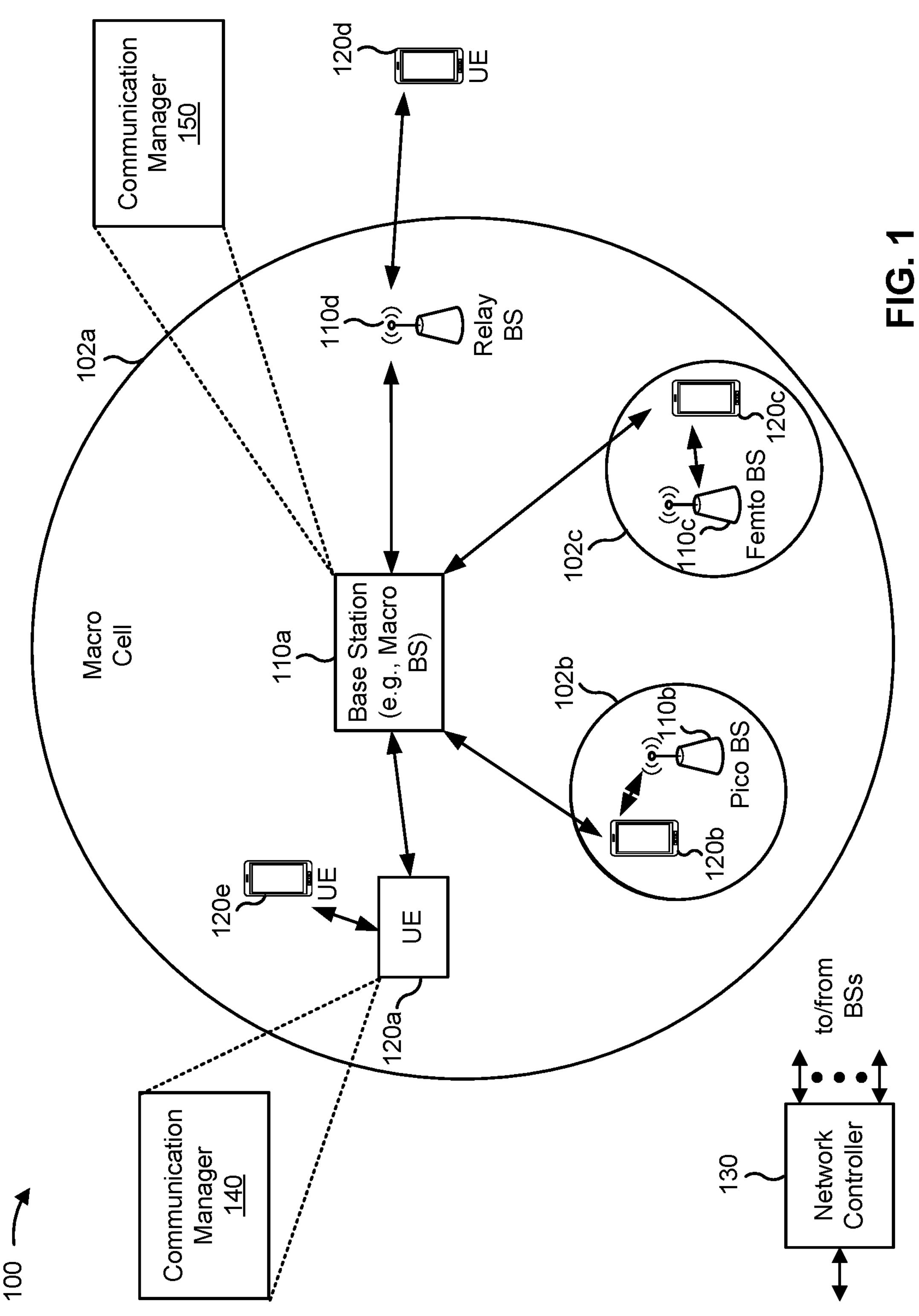
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, a UE capability information request message; and transmit, to the network entity in response to the UE capability information request message, a UE capability information message indicating one or more antenna capabilities of the UE. Additionally, or alternatively, the communication manager 140 may perform one or more other operations described herein.

In some aspects, a network entity, such as the base station 110, may include a communication manager 150. As described in more detail elsewhere herein, the communication manager 150 may transmit a UE capability information request message for a UE; and receive, in response to the UE capability information request message, a UE capability information message indicating one or more antenna capabilities of the UE. Additionally, or alternatively, the communication manager 150 may perform one or more other operations described herein.

As indicated above, FIG. 1 is provided as an example. Other examples may differ from what is described with regard to FIG. 1.

Figure 2:
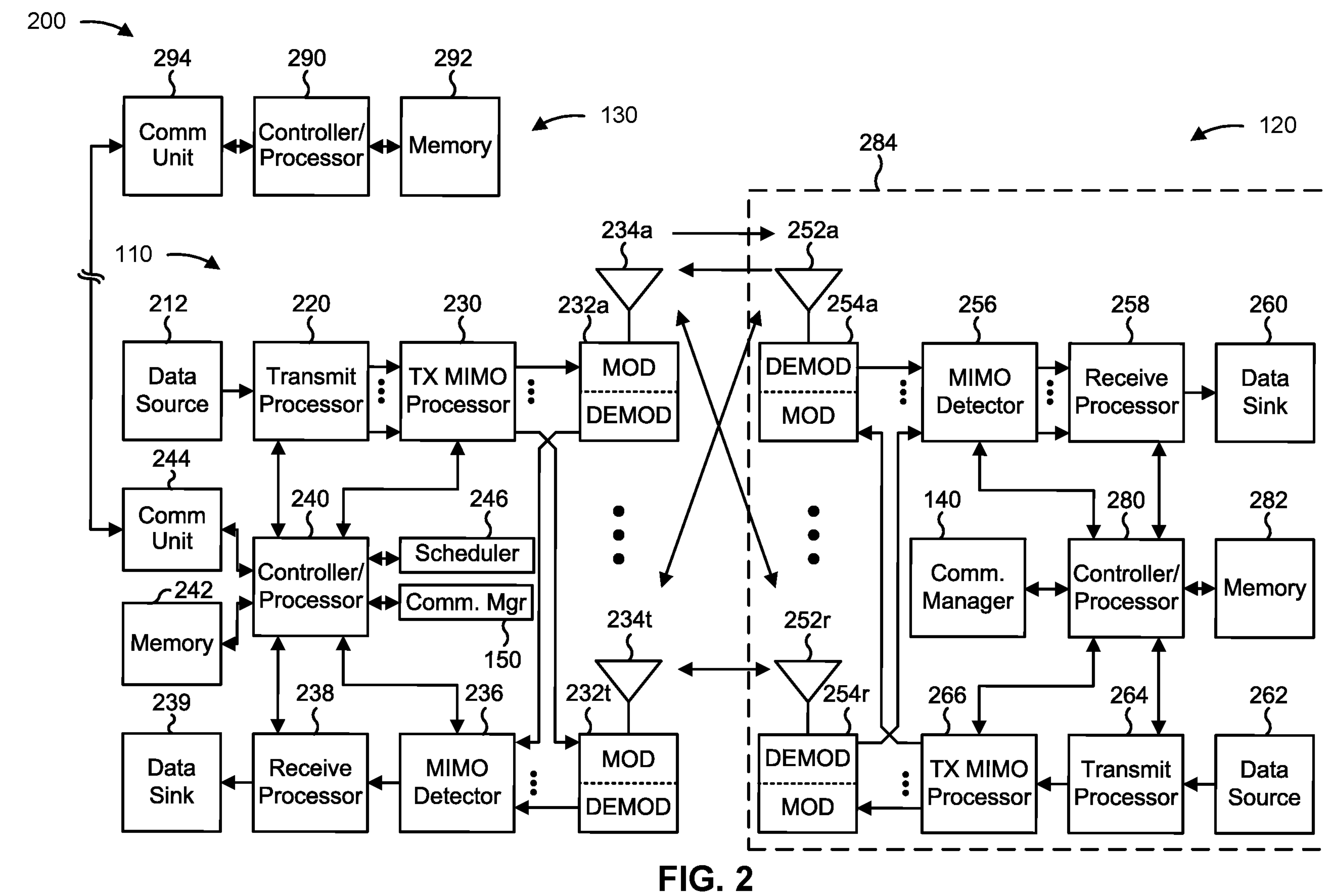
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with UE antenna capability indication, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network entity, a UE capability information request message; and/or means for transmitting, to the network entity in response to the UE capability information request message, a UE capability information message indicating one or more antenna capabilities of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity, such as the base station 110, includes means for transmitting a UE capability information request message for a UE; and/or means for receiving, in response to the UE capability information request message, a UE capability information message indicating one or more antenna capabilities of the UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR BS, 5G NB, access point (AP), a TRP, or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
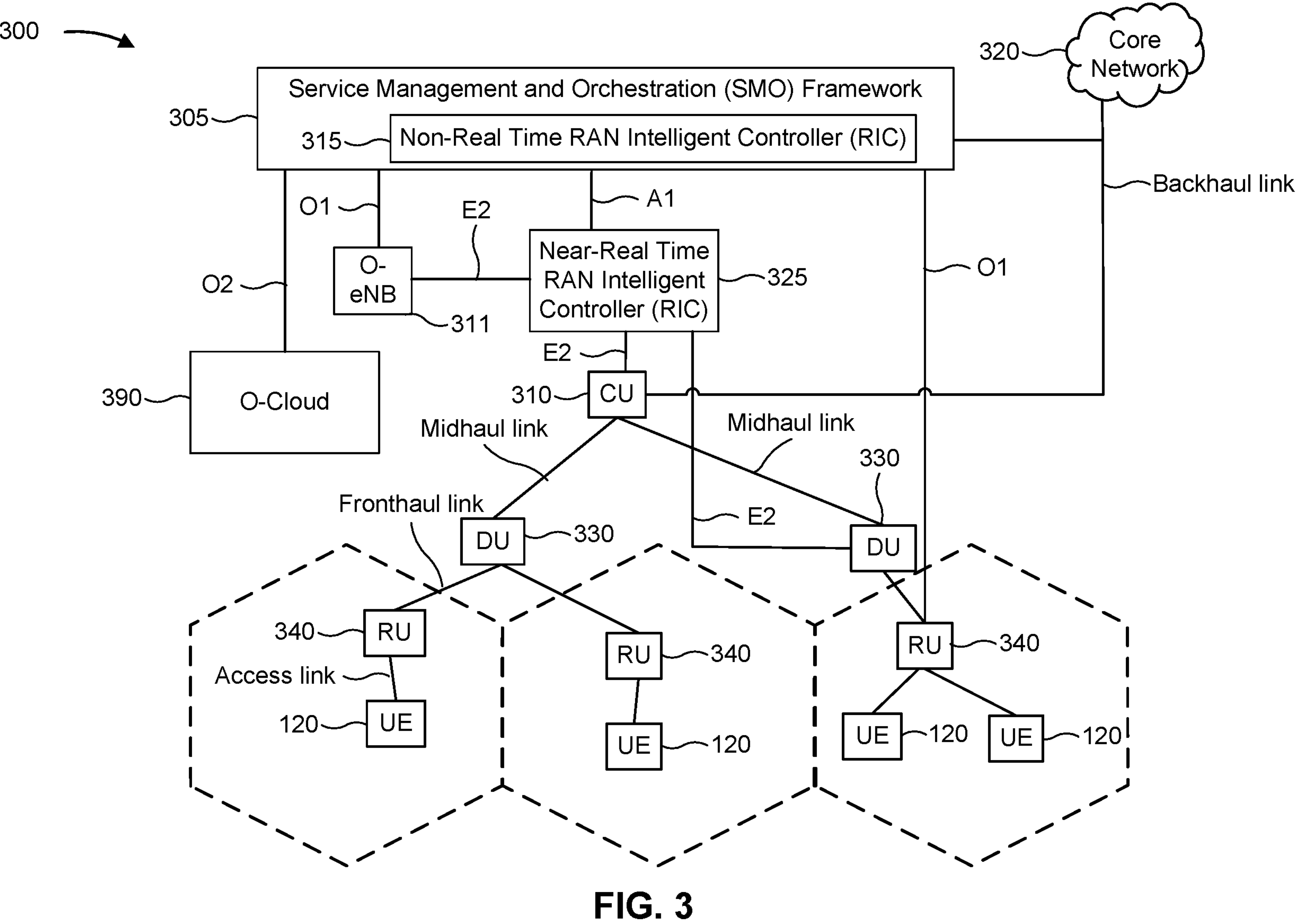
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
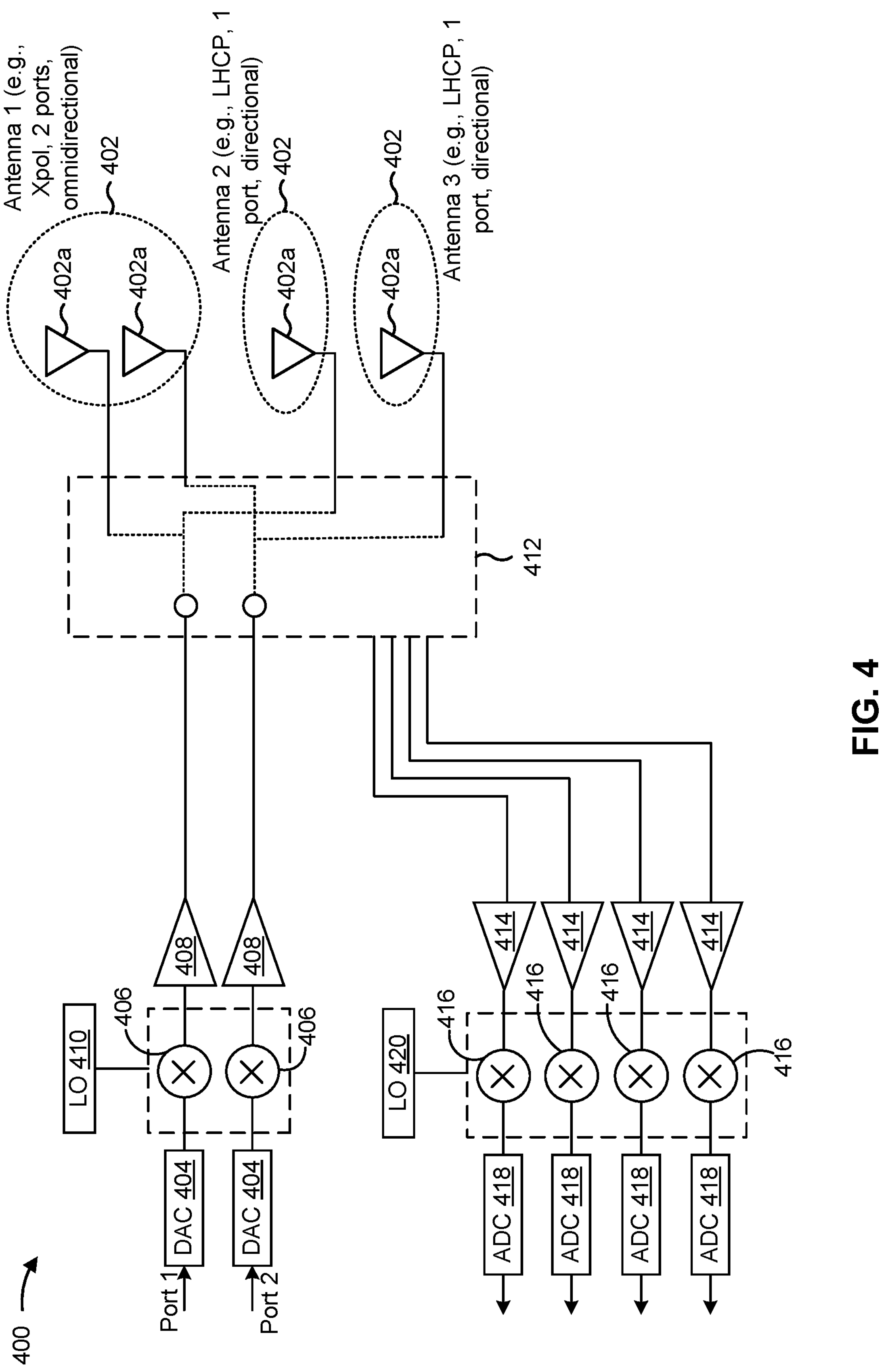
FIG. 4 is a diagram illustrating an example antenna architecture, in accordance with the present disclosure.

FIG. 4 is a diagram illustrating an example antenna architecture 400, in accordance with the present disclosure. In some examples, architecture 400 may implement aspects of wireless network 100. In some examples, architecture 400 may be implemented in a transmitting device (e.g., a first wireless communication device, UE, or base station) and/or a receiving device (e.g., a second wireless communication device, UE, or base station), as described herein. In some examples, architecture 400 may be implemented in an uncrewed aerial vehicle (UAV).

As shown in FIG. 4, the architecture 400 includes two transmission (TX) chains, four reception (RX) chains, and three physical antennas. However, the architecture of FIG. 4 is one example, and other examples with a different quantity of TX chains, RX chains, and/or physical antennas are possible. Moreover, a TX chain and/or an RX chain may include additional components to those described herein.

The architecture 400 may include one or more antenna elements 402. As shown, an antenna element 402 may include one or more sub-elements **402*a* (e.g., an antenna element 402 may include a first sub-element 402*a* cross-polarized with a second sub-element 402*a* that can be used to independently transmit cross-polarized signals). In some examples, the antenna elements 402 may be passive, with negligible switching time between antenna elements 402, and multiple antenna elements 402 may be activated simultaneously. An antenna element 402 may be an omnidirectional antenna or a directional antenna. In some examples, a UE equipped with a directional antenna may communicate in FR1. Moreover, an antenna element 402** may have a linear polarization (e.g., a horizontal polarization, a vertical polarization, or cross polarization (Xpol)) or a circular polarization (e.g., a left hand circular polarization (LHCP) or a right hand circular polarization (RHCP)).

A TX chain may include a digital to analog converter (DAC) 404, a mixer 406, and/or a power amplifier 408. The DAC 404 of a TX chain may convert a digital baseband signal received from a modem (e.g., a modem 232 or a modem 254) into an analog baseband signal. The mixer 406 of the TX chain may upconvert the analog baseband signal to an analog intermediate frequency (IF) signal and/or an analog RF signal using a local oscillator (LO) 410. The power amplifier 408 of the TX chain may provide a desired level of positive or negative gain of the signal. A switch/duplexer 412 may receive signals from the TX chain(s) and direct the signals to one or more antennas 402 for transmission.

An RX chain may include a low noise amplifier (LNA) 414, a mixer 416, and/or analog to digital converter (ADC) 418. RF signals received by the antenna elements 402 may be provided, via the switch/duplexer 412, to the LNA 414 of an RX chain for signal amplification. The output of the LNA 414 may be input into the mixer 416 of the RX chain, where a signal is downconverted using an input from an LO 420 to generate an IF signal and/or a baseband signal. The ADC 418 of the RX chain converts the signal output from the mixer 416 to a digital signal. The digital signal may be received by the modem for baseband processing, such as decoding, de-interleaving, or similar operations.

As indicated above, FIG. 4 is provided as an example. Other examples may differ from what is described with regard to FIG. 4.

Figure 5:
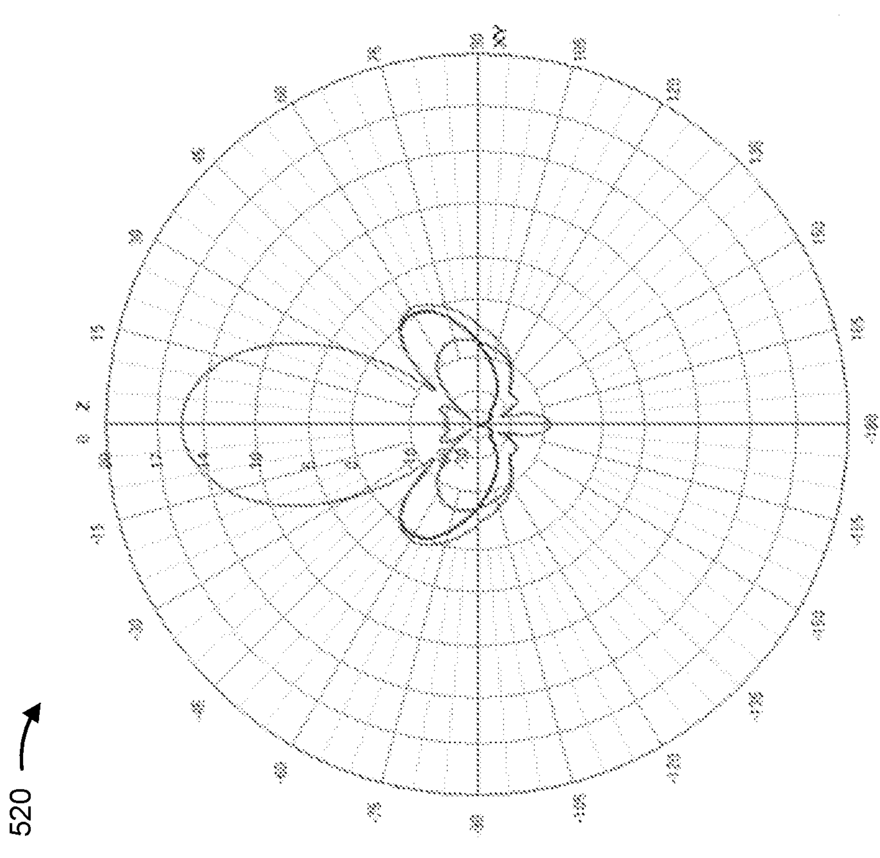
FIG. 5 is a diagram illustrating examples of radiation patterns of directional antennas, in accordance with the present disclosure.
Figure 5:
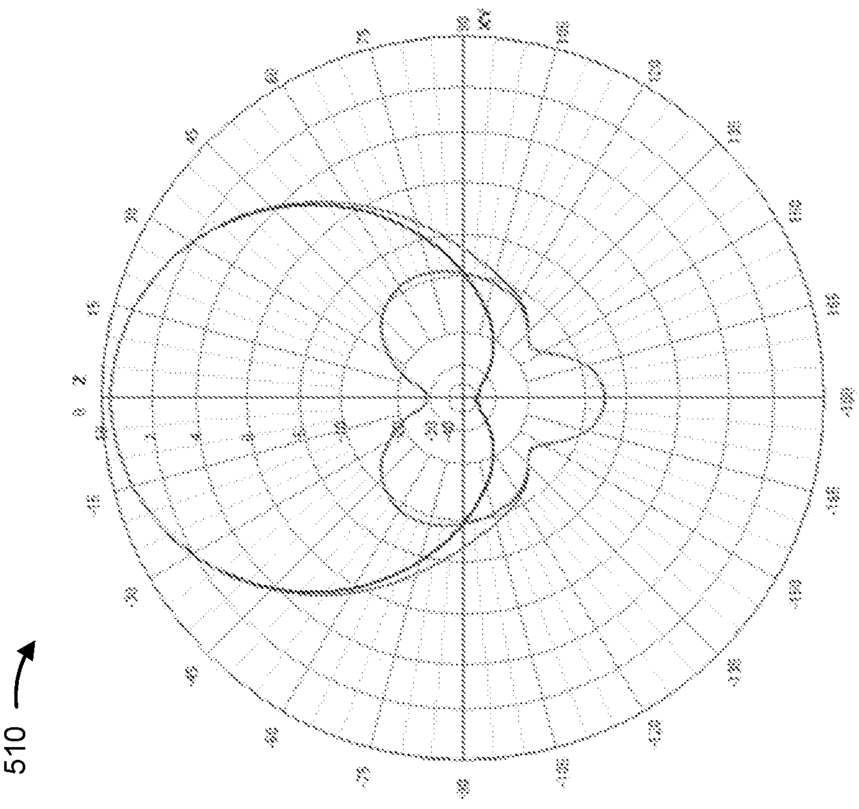

FIG. 5 is a diagram illustrating examples 510 and 520 of radiation patterns of directional antennas, in accordance with the present disclosure. As shown by examples 510 and 520, radiation emitted by a directional antenna may have a main lobe associated with a highest power density and one or more side lobes relative to the main lobe. The radiation pattern of example 510 may be associated with a directional antenna associated with a gain of 10 decibels (isotropic circular) (dBiC) and a beam width of 120 degrees. The radiation pattern of example 520 may be associated with a directional antenna associated with a gain of 15.5 dBiC, an axial ratio of 0.9, and a beam width of 65 degrees.

As indicated above, FIG. 5 is provided as an example. Other examples may differ from what is described with regard to FIG. 5.

Figure 6:
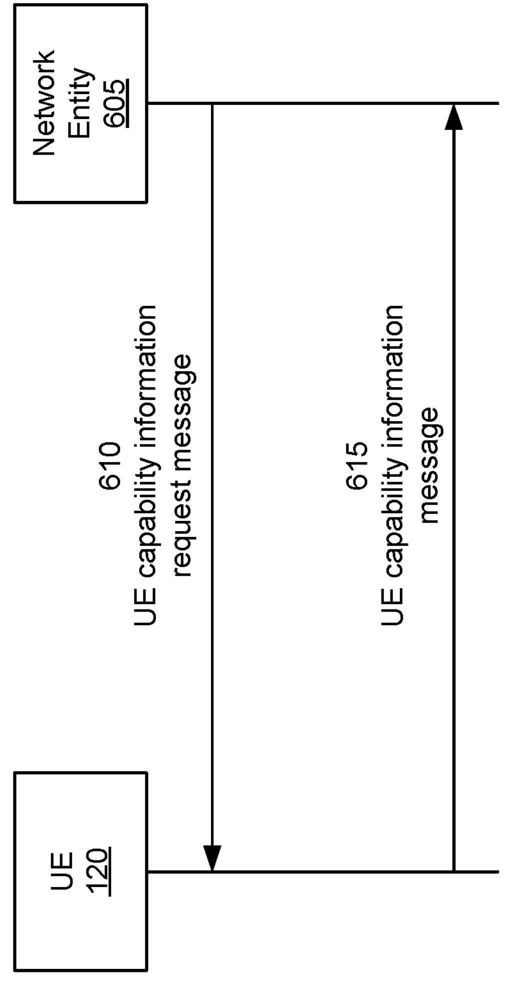
FIG. 6 is a diagram illustrating an example of a capability transfer procedure, in accordance with the present disclosure.

FIG. 6 is a diagram illustrating an example 600 of a capability transfer procedure, in accordance with the present disclosure. As shown in FIG. 6, example 600 includes communication between a UE 120 and a network entity 605 (e.g., a base station 110, a CU 310, a DU 330, an RU 340, or the like).

As shown by reference number 610, the network entity 605 may transmit, and the UE 120 may receive, a UE capability information request message (e.g., a UECapabilityEnquiry message). The network entity 605 may transmit the UE capability information request message to the UE 120 when the UE 120 is in a connected state (e.g., an RRC connected state). Further, the network entity 605 may transmit the UE capability information request message to the UE 120 when UE radio access capability information (or additional UE radio access capability information) is needed. The UE capability information request message may indicate filter criteria for UE capability information (e.g., using a capabilityRequestFilterCommon parameter and/or a frequencyBandListFilter parameter of a UE-CapabilityRequestFilter NR information element). For example, the filter criteria may include a frequency band filter that indicates frequency bands for which UE capability information is to be reported.

Upon receiving the UE capability information request message, the UE 120 may compile a list of candidate band combinations according to the filter criteria indicated by the UE capability information request message (e.g., the filter criteria indicated by the capabilityRequestFilterCommon parameter and only including bands indicated by the frequencyBandListFilter parameter). For example, the candidate band combination list compiled by the UE 120 may include only band combinations that include bands indicated by the frequency band filter (e.g., the frequencyBandListFilter parameter). Moreover, the candidate band combination list may be prioritized in order of bands indicated by the frequency band filter (e.g., the list first includes band combinations containing the first-listed band of the frequency band filter, the list then includes remaining band combinations containing the second-listed band of the frequency band filter, and so forth). Furthermore, for each band in the list of candidate band combinations, parameters (e.g., a maxBandwidthRequestedDL parameter, a maxBandwidthRequestedUL parameter, a maxCarriersRequestedDL parameter, a maxCarriersRequestedUL parameter, a ca-BandwidthClassDLEUTRA parameter, and/or ca-BandwidthClassUL-EUTRA parameter) associated with the band may not exceed indicated values for the parameters (e.g., for whichever of the parameters that values are indicated for the UE 120).

As shown by reference number 615, in response to the UE capability information request message, the UE 120 may transmit, and the network entity 605 may receive, a UE capability information message (e.g., a UECapabilityInformation message) that indicates UE capability information for the UE 120. In some examples, the network entity 605 may obtain the UE capability information for the UE 120 only after access stratum security activation. Moreover, information relating to UE capabilities of the UE 120 obtained by the network entity 605 before access stratum security activation may not be forwarded to a core network.

The UE capability information may indicate frequency band information (e.g., in a FreqBandList information element). For example, the frequency band information may indicate (e.g., for one or more Evolved Universal Mobile Telecommunications System (UMTS) Terrestrial Radio Access (EUTRA) bands and/or one or more NR bands) one or more of the aforementioned parameters and/or an aggregate bandwidth. Moreover, the UE capability information may include feature sets information. For example, the UE capability information may indicate, in a feature sets information element (e.g., a featureSets information element), UE capabilities for one or more feature sets referenced in a candidate feature set combinations list compiled by the UE 120, and may exclude one or more feature sets associated with parameters (e.g., a maxBandwidthRequestedDL parameter, a maxBandwidthRequestedUL parameter, a maxCarriersRequestedDL parameter, and/or a maxCarriersRequestedUL parameter) that exceed indicated values for the parameters (e.g., for whichever of the parameters that values are indicated for the UE 120).

However, wireless networks generally lack support for techniques to signal, indicate, or otherwise enable reporting of UE antenna capabilities (e.g., beamforming capabilities, or the like). For example, wireless networks generally lack support for techniques to signal, indicate, or otherwise enable reporting of UE antenna capabilities for a UE, such as a UAV, equipped with directional antennas. Thus, a network entity may provide power control settings, scheduling, and/or sounding reference signal (SRS) configurations for the UE that may not be as suitable as other power control settings, scheduling, and/or SRS configurations that would otherwise be provided for the UE if the UE's antenna capabilities were known. As a result, a performance of communications of the UE may be adversely affected.

Some techniques and apparatuses described herein provide for UE antenna capability indication. For example, a UE may transmit, to a network entity, a UE capability information message that indicates one or more antenna capabilities of the UE. The antenna capabilities may indicate a quantity of physical antennas for transmission and/or reception, omnidirectional or directional classifications for antennas, antenna polarization types, antenna main lobe information and/or side lobe information, antenna steering information, and/or a switching time between antennas. Based at least in part on the UE's antenna capabilities, the UE may receive improved power control settings, scheduling, and/or SRS configurations from the network entity, thereby improving a performance of communications of the UE. For example, a power control setting may indicate that the UE is to use a lower power for a directional antenna or a higher power for an omnidirectional antenna. As another example, scheduling for the UE may allocate a relatively larger frequency resource (e.g., the whole band) to the UE for a directional antenna (e.g., because a directional antenna causes less interference than an omnidirectional antenna). As a further example, an SRS configuration may be based on a quantity of directional antennas of the UE (or a quantity of UE beams).

As indicated above, FIG. 6 is provided as an example. Other examples may differ from what is described with regard to FIG. 6.

Figure 7:
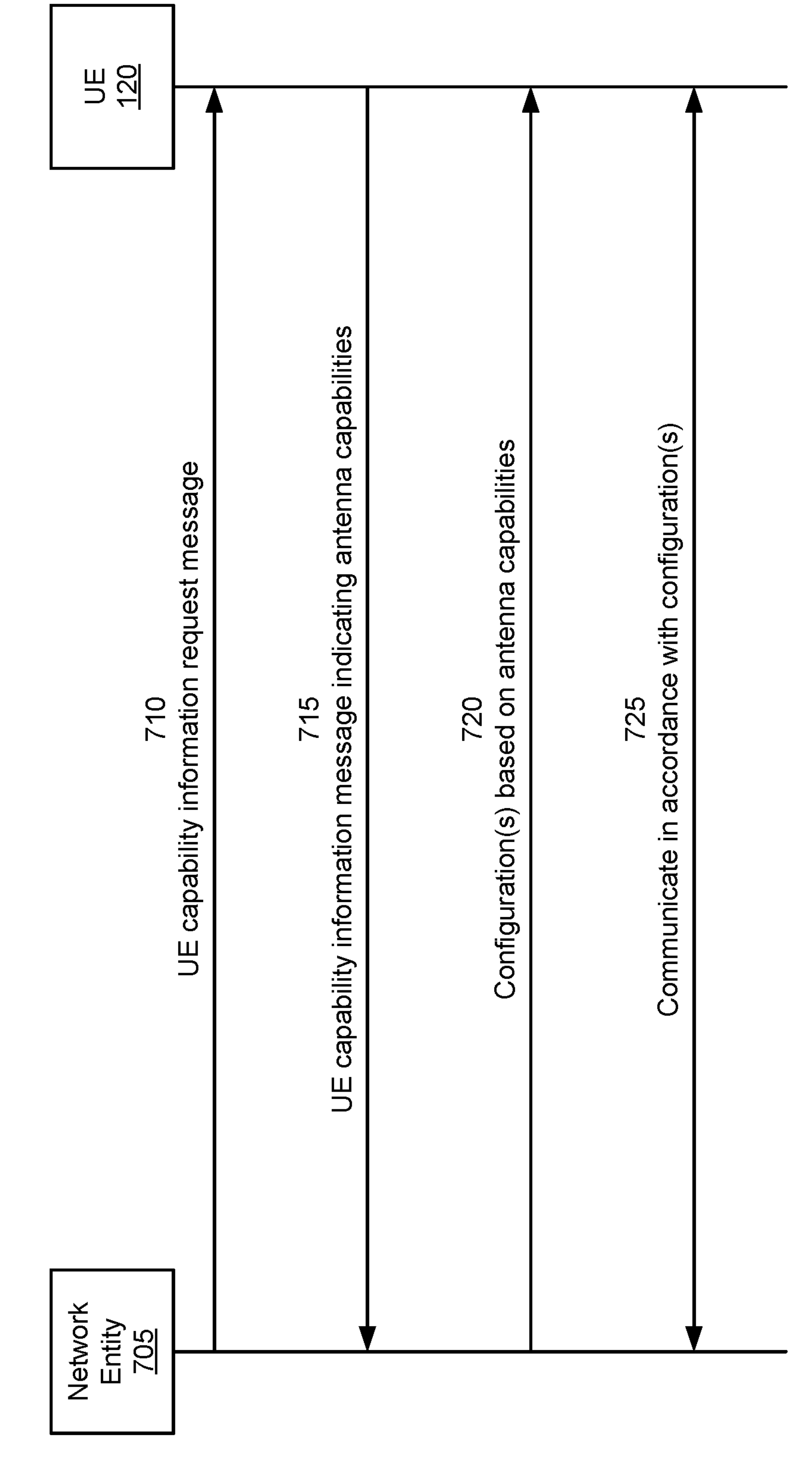
FIG. 7 is a diagram illustrating an example associated with UE antenna capability indication, in accordance with the present disclosure.

FIG. 7 is a diagram illustrating an example 700 associated with UE antenna capability indication, in accordance with the present disclosure. As shown in FIG. 7, a network entity 705 and a UE 120 may communicate with one another. The network entity 705 may include a base station 110, a CU 310, a DU 330, an RU 340, or the like. In some aspects, the network entity 705 may correspond to the network entity 605. In some aspects, the UE 120 may be a UAV. The UE 120 and the network entity 705 may perform a capability transfer procedure, such as the capability transfer described in connection with FIG. 6.

As shown by reference number 710, the network entity 705 may transmit, and the UE 120 may receive, a UE capability information request message (e.g., in a similar manner as described in connection with FIG. 6). The UE capability information request message may indicate a request for the UE 120 to provide UE capability information. In some aspects, the UE capability information request message may include an indication that the UE 120 is to provide UE capability information relating to one or more antenna capabilities of the UE 120.

As shown by reference number 715, the UE 120 may transmit, and the network entity 705 may receive, a UE capability information message (e.g., in a similar manner as described in connection with FIG. 6). The UE capability information message may indicate UE capability information for the UE 120. For example, the UE capability information message may indicate one or more antenna capabilities (e.g., UE antenna capabilities) of the UE 120.

In some aspects, the UE capability information message may indicate the one or more antenna capabilities of the UE 120 on a per-frequency group basis. A frequency group may refer to a frequency-delineated grouping or range. For example, the UE capability information message may indicate the one or more antenna capabilities on a per-frequency band combination basis. A frequency band combination is a group of two or more bands on which component carriers can be configured. As another example, the UE capability information message may indicate the one or more antenna capabilities on a per-frequency band basis. As a further example, the UE capability information message may indicate the one or more antenna capabilities on a per-component carrier basis. A component carrier is a carrier that may be combined (e.g., into a single channel) with one or more other carriers in carrier aggregation (e.g., to enhance data capacity).

In some aspects, the one or more antenna capabilities, indicated in the UE capability information message, may indicate a quantity of physical antennas of the UE 120 for transmission (e.g., that may be used for transmission) and/or a quantity of physical antennas of the UE 120 for reception (e.g., that may be used for reception). In some aspects, the one or more antenna capabilities, indicated in the UE capability information message, may indicate a classification for each antenna of the UE 120 as omnidirectional or directional. In some aspects, the one or more antenna capabilities, indicated in the UE capability information message, may indicate a polarization type for each antenna of the UE 120. The polarization type may be linear (e.g., horizontal, vertical, or Xpol) or circular (e.g., LHCP or RHCP). In some aspects, the polarization type may be indicated as horizontal, vertical, or Xpol for linear polarization, or the polarization type may be indicated as LHCP or RHCP for circular polarization. In some aspects, the one or more antenna capabilities, indicated in the UE capability information message, may indicate an axial ratio for each antenna associated with a circular polarization type.

In some aspects, the one or more antenna capabilities, indicated in the UE capability information message, may indicate a main lobe beamwidth (e.g., by elevation and azimuth) for each antenna of the UE 120. The main lobe beamwidth may be indicated as a first type (type 1) of beamwidth and/or a second type (type 2) of beamwidth. The first type of beamwidth may characterize a beamwidth at a coverage where reception is at least equivalent to an omnidirectional antenna. The second type of beamwidth may characterize a beamwidth at 3 decibels (dB) (e.g., at a coverage where at least 70% of a maximum range is obtained). In some aspects, the one or more antenna capabilities, indicated in the UE capability information message, may indicate a directive gain associated with a main lobe for each antenna of the UE 120. In some aspects, the one or more antenna capabilities, indicated in the UE capability information message, may indicate a direction of a main lobe for each antenna of the UE 120. The direction of a main lobe may be indicated with respect to a local coordinate system of the UE 120.

In some aspects, the one or more antenna capabilities, indicated in the UE capability information message, may indicate side lobe information for each antenna of the UE 120. The side lobe information may indicate a quantity of side lobes. Moreover, for each side lobe, the side lobe information may indicate a beamwidth of the side lobe (e.g., a type 1 indication or a type 2 indication), a gain of the side lobe, and/or an orientation of the side lobe with respect to a main lobe (e.g., by elevation and azimuth). In some aspects, the one or more antenna capabilities, indicated in the UE capability information message, may indicate a switching time between antennas (e.g., a time needed by the UE 120 to switch from using a first antenna to using a second antenna). In some aspects, the one or more antenna capabilities, indicated in the UE capability information message, may indicate whether each antenna of the UE 120 is steerable. In some aspects, the one or more antenna capabilities, indicated in the UE capability information message, may indicate an effective isotropic radiated power (EIRP) of each antenna of the UE 120.

Additionally, or alternatively, the UE capability information message may indicate one or more antenna group capabilities of the UE 120. For example, the one or more antenna capabilities, indicated in the UE capability information message, may indicate the one or more antenna group capabilities. In some aspects, the UE capability information message may indicate the one or more antenna capabilities of the UE 120 on a per-antenna group basis. An antenna group may refer to a collection (e.g., one or more) of physical antennas of the UE 120. In some aspects, antenna groups for the UE 120 may be restricted such that each antenna group includes the same quantity of ports. For example, with reference to FIG. 4, a first antenna group may include Antenna 1 (e.g., having two ports) and a second antenna group may include Antenna 2 (e.g., having one port) and Antenna 3 (e.g., having one port). Here, the first antenna group may support a fully-coherent codebook, and the second antenna group may support a non-coherent codebook, for codebook-based physical uplink shared channel (PUSCH) transmission.

In another example of antenna grouping, with reference to FIG. 4, a first antenna group may include Antenna 1, a second antenna group may include Antenna 2, and a third antenna group may include antenna 3. Here, the first antenna group may support a maximum transmission rank (e.g., a maximum quantity of transmission layers) for PUSCH transmission of two, and the second antenna group and the third antenna group, respectively, may support a maximum transmission rank of one. Furthermore, the first antenna group may support codebook-based PUSCH transmission and the second antenna group and the third antenna group may not support codebook-based PUSCH transmission.

In some aspects, the one or more antenna group capabilities, indicated in the UE capability information message, may indicate a maximum quantity of transmission layers (e.g., a maximum transmission rank) for an antenna group. In some aspects, the one or more antenna group capabilities, indicated in the UE capability information message, may indicate a codebook usage for an antenna group (e.g., whether the antenna group supports codebook-based PUSCH transmission and/or a codebook type supported by the antenna group).

As shown by reference number 720, the network entity 705 may transmit, and the UE 120 may receive, one or more configurations for the UE 120. The one or more configurations may be based at least in part on the UE capability information indicated by the UE 120. The UE 120 may receive the one or more configurations via one or more of RRC signaling, one or more MAC control elements (MAC-CEs), and/or downlink control information (DCI), among other examples.

As described herein, the one or more configurations may include one or more power control settings for the UE 120, scheduling (e.g., an uplink grant) for the UE 120, and/or one or more SRS configurations for the UE 120. For example, a power control setting may indicate that the UE 120 is to use a lower power for a directional antenna or that the UE 120 is to use a higher power for an omnidirectional antenna. As another example, the scheduling for the UE 120 may allocate a relatively larger frequency resource (e.g., the whole band) to the UE 120 for a directional antenna. As a further example, an SRS configuration may be based on a quantity of directional antennas of the UE 120.

As shown by reference number 725, the UE 120 and the network entity 705 may communication based at least in part on the one or more configurations. For example, the UE 120 may communicate with the network entity 705 in accordance with the one or more power control settings, the scheduling, and/or the one or more SRS configurations. In this way, a performance of communications of the UE 120 may be improved.

As indicated above, FIG. 7 is provided as an example. Other examples may differ from what is described with respect to FIG. 7.

Figure 8:
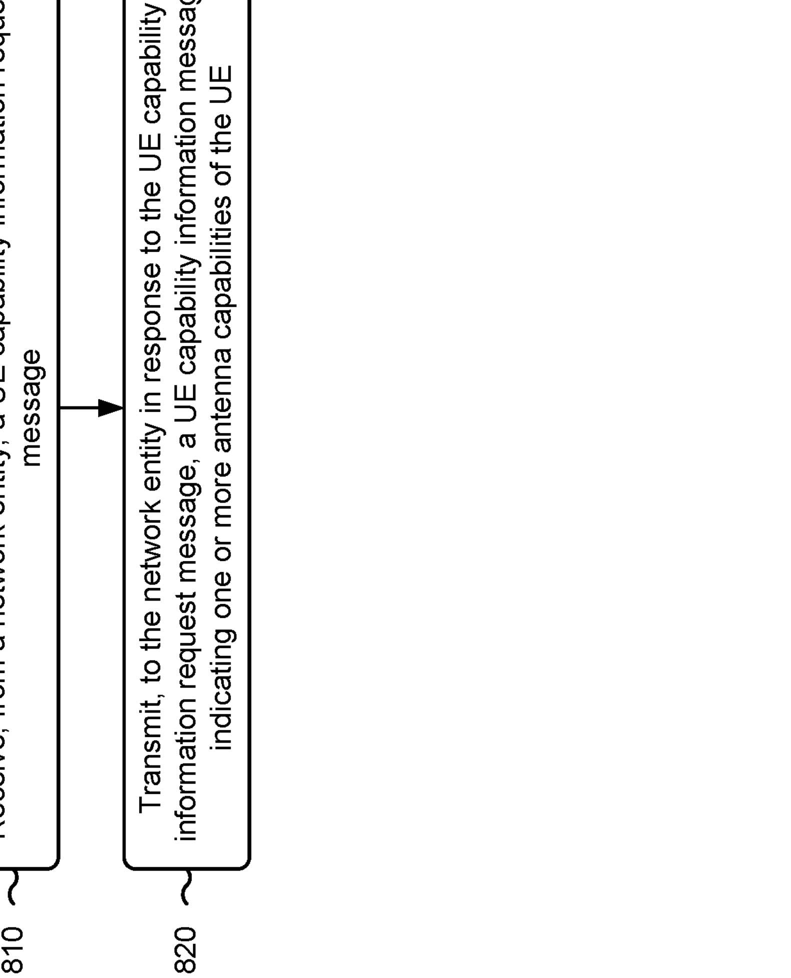
FIGS. 8-9 are diagrams illustrating example processes associated with UE antenna capability indication, in accordance with the present disclosure.

FIG. 8 is a diagram illustrating an example process 800 performed, for example, by a UE, in accordance with the present disclosure. Example process 800 is an example where the UE (e.g., UE 120) performs operations associated with UE antenna capability indication.

As shown in FIG. 8, in some aspects, process 800 may include receiving, from a network entity, a UE capability information request message (block 810). For example, the UE (e.g., using communication manager 1008 and/or reception component 1002, depicted in FIG. 10) may receive, from a network entity, a UE capability information request message, as described above.

As further shown in FIG. 8, in some aspects, process 800 may include transmitting, to the network entity in response to the UE capability information request message, a UE capability information message indicating one or more antenna capabilities of the UE (block 820). For example, the UE (e.g., using communication manager 1008 and/or transmission component 1004, depicted in FIG. 10) may transmit, to the network entity in response to the UE capability information request message, a UE capability information message indicating one or more antenna capabilities of the UE, as described above.

Process 800 may include additional aspects, such as any single aspect or any combination of aspects described below and/or in connection with one or more other processes described elsewhere herein.

In a first aspect, the UE capability information message indicates the one or more antenna capabilities on a per-band combination basis.

In a second aspect, the UE capability information message indicates the one or more antenna capabilities on a per-band basis.

In a third aspect, the UE capability information message indicates the one or more antenna capabilities on a per-component carrier basis.

In a fourth aspect, alone or in combination with one or more of the first through third aspects, the one or more antenna capabilities of the UE indicate one or more of a quantity of physical antennas for transmission, a quantity of physical antennas for reception, a classification of an antenna as omnidirectional or directional, a polarization type of an antenna, an axial ratio for circular polarization, a main lobe beamwidth of an antenna, a directive gain of a main lobe of an antenna, a direction of a main lobe of an antenna, siding lobe information for an antenna, a switching time between antennas, whether an antenna is steerable, or an EIRP of an antenna.

In a fifth aspect, alone or in combination with one or more of the first through fourth aspects, the side lobe information indicates one or more of a quantity of side lobes, a beamwidth of a side lobe, a gain of a side lobe, or an orientation of a side lobe with respect to a main lobe.

In a sixth aspect, alone or in combination with one or more of the first through fifth aspects, the UE capability information message further indicates one or more antenna group capabilities of the UE.

In a seventh aspect, alone or in combination with one or more of the first through sixth aspects, the UE capability information message indicates the one or more antenna group capabilities on a per-antenna group basis.

In an eighth aspect, alone or in combination with one or more of the first through seventh aspects, the one or more antenna group capabilities of the UE indicate one or more of a maximum quantity of transmission layers for an antenna group, or a codebook usage for an antenna group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
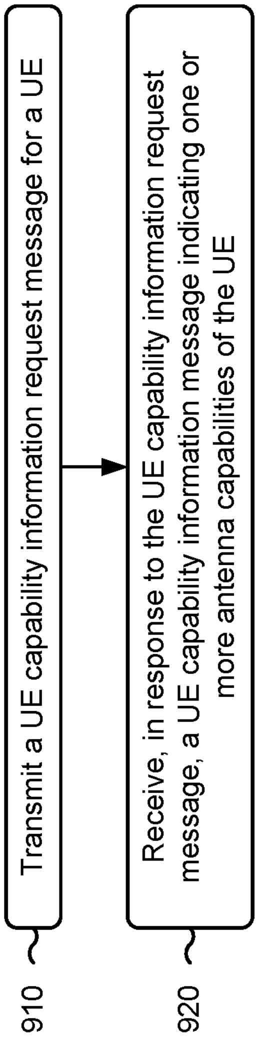

FIG. 9 is a diagram illustrating an example process 900 performed, for example, by a network entity, in accordance with the present disclosure. Example process 900 is an example where the network entity (e.g., network entity 705) performs operations associated with UE antenna capability indication.

As shown in FIG. 9, in some aspects, process 900 may include transmitting a UE capability information request message for a UE (block 910). For example, the network entity (e.g., using communication manager 1108 and/or transmission component 1104, depicted in FIG. 11) may transmit a UE capability information request message for a UE, as described above.

As further shown in FIG. 9, in some aspects, process 900 may include receiving, in response to the UE capability information request message, a UE capability information message indicating one or more antenna capabilities of the UE (block 920). For example, the network entity (e.g., using communication manager 1108 and/or reception component 1102, depicted in FIG. 11) may receive, in response to the indicating one or more antenna capabilities of the UE, as described above.

Process 900 may include additional aspects, such as any single aspect or any combination of aspects described below and/or in connection with one or more other processes described elsewhere herein.

In a first aspect, the UE capability information message indicates the one or more antenna capabilities on a per-band combination basis.

In a second aspect, the UE capability information message indicates the one or more antenna capabilities on a per-band basis.

In a third aspect, the UE capability information message indicates the one or more antenna capabilities on a per-component carrier basis.

In a fourth aspect, alone or in combination with one or more of the first through third aspects, the one or more antenna capabilities of the UE indicate one or more of a quantity of physical antennas for transmission, a quantity of physical antennas for reception, a classification of an antenna as omnidirectional or directional, a polarization type of an antenna, an axial ratio for circular polarization, a main lobe beamwidth of an antenna, a directive gain of a main lobe of an antenna, a direction of a main lobe of an antenna, siding lobe information for an antenna, a switching time between antennas, whether an antenna is steerable, or an EIRP of an antenna.

In a fifth aspect, alone or in combination with one or more of the first through fourth aspects, the side lobe information indicates one or more of a quantity of side lobes, a beamwidth of a side lobe, a gain of a side lobe, or an orientation of a side lobe with respect to a main lobe.

In a sixth aspect, alone or in combination with one or more of the first through fifth aspects, the UE capability information message further indicates one or more antenna group capabilities of the UE.

In a seventh aspect, alone or in combination with one or more of the first through sixth aspects, the UE capability information message indicates the one or more antenna group capabilities on a per-antenna group basis.

In an eighth aspect, alone or in combination with one or more of the first through seventh aspects, the one or more antenna group capabilities of the UE indicate one or more of a maximum quantity of transmission layers for an antenna group, or a codebook usage for an antenna group.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
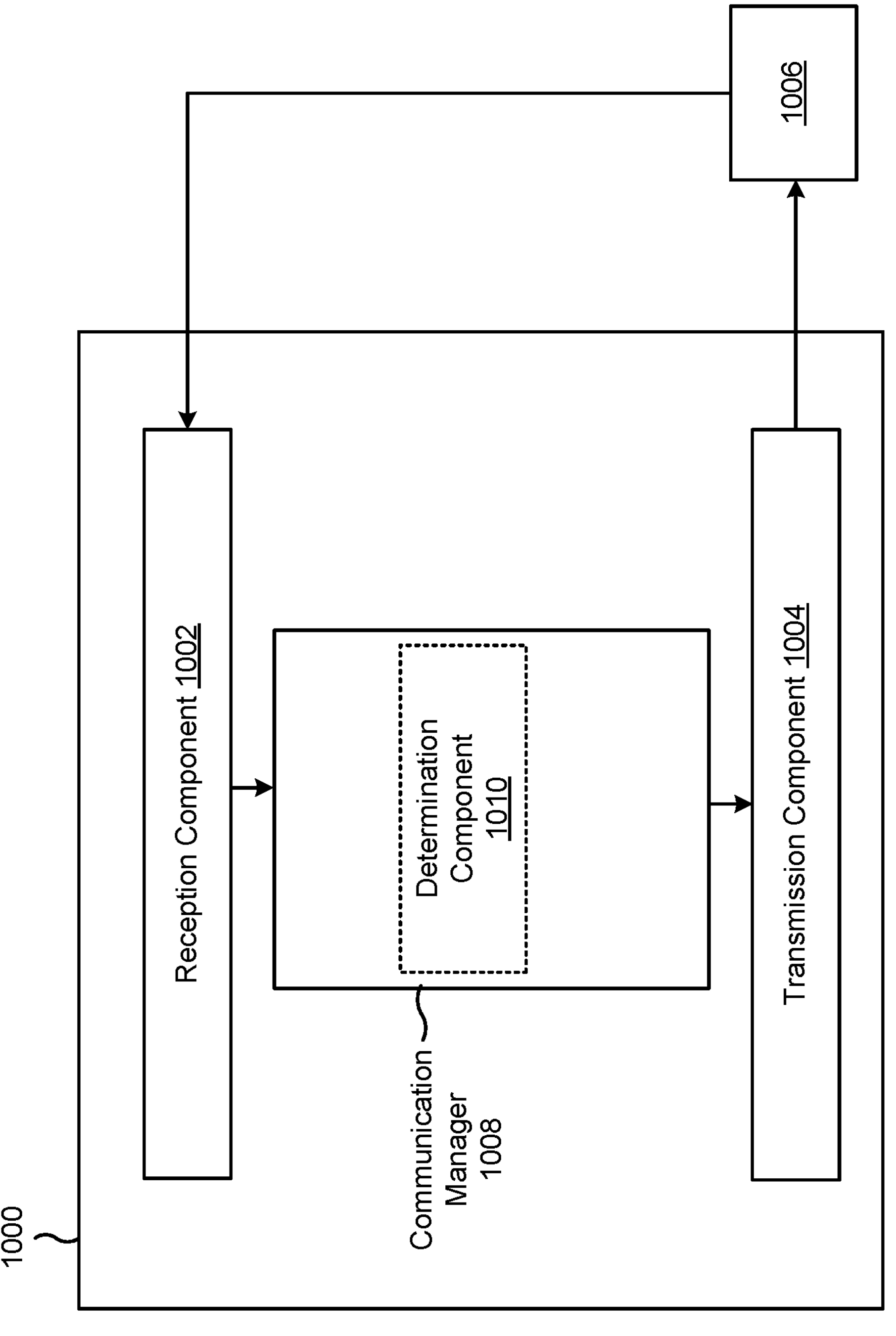
FIGS. 10-11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008. The communication manager 1008 may be, may include, or may be similar to, the communication manager 140. The communication manager 1008 may include a determination component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a network entity, a UE capability information request message. The determination component 1010 may determine one or more antenna capabilities of the apparatus 1000. The transmission component 1004 may transmit, to the network entity in response to the UE capability information request message, a UE capability information message indicating one or more antenna capabilities of the apparatus 1000.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
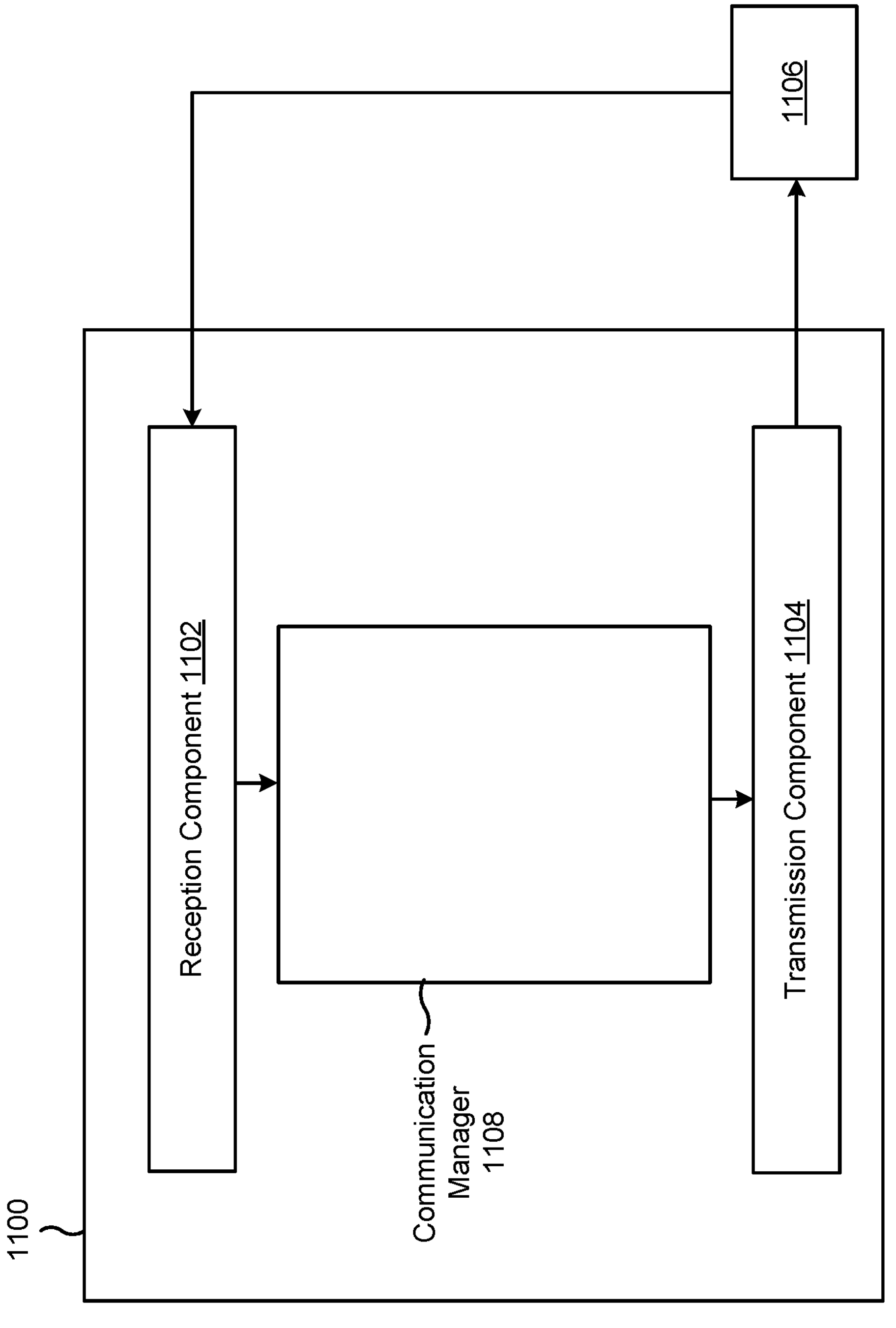

FIG. 11 is a diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108. The communication manager 1108 may be, may include, or may be similar to, the communication manager 150.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network entity described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network entity described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network entity described in connection with FIG. 2. In some aspects, the transmission component 1104 may be co-located with the reception component 1102 in a transceiver.

The transmission component 1104 may transmit a UE capability information request message for a UE. The reception component 1102 may receive, in response to the UE capability information request message, a UE capability information message indicating one or more antenna capabilities of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network entity, a UE capability information request message; and transmitting, to the network entity in response to the indicating one or more antenna capabilities of the UE.

Aspect 2: The method of Aspect 1, wherein the UE capability information message indicates the one or more antenna capabilities on a per-band combination basis.

Aspect 3: The method of Aspect 1, wherein the UE capability information message indicates the one or more antenna capabilities on a per-band basis.

Aspect 4: The method of Aspect 1, wherein the UE capability information message indicates the one or more antenna capabilities on a per-component carrier basis.

Aspect 5: The method of any of Aspects 1-4, wherein the one or more antenna capabilities of the UE indicate one or more of: a quantity of physical antennas for transmission, a quantity of physical antennas for reception, a classification of an antenna as omnidirectional or directional, a polarization type of an antenna, an axial ratio for circular polarization, a main lobe beamwidth of an antenna, a directive gain of a main lobe of an antenna, a direction of a main lobe of an antenna, side lobe information for an antenna, a switching time between antennas, whether an antenna is steerable, or an effective isotropic radiated power (EIRP) of an antenna.

Aspect 6: The method of Aspect 5, wherein the side lobe information indicates one or more of: a quantity of side lobes, a beamwidth of a side lobe, a gain of a side lobe, or an orientation of a side lobe with respect to a main lobe.

Aspect 7: The method of any of Aspects 1-6, wherein the UE capability information message further indicates one or more antenna group capabilities of the UE.

Aspect 8: The method of Aspect 7, wherein the UE capability information message indicates the one or more antenna group capabilities on a per-antenna group basis.

Aspect 9: The method of any of Aspects 7-8, wherein the one or more antenna group capabilities of the UE indicate one or more of: a maximum quantity of transmission layers for an antenna group, or a codebook usage for an antenna group.

Aspect 10: A method of wireless communication performed by a network entity, comprising: transmitting a user equipment (UE) capability information request message for a UE; and receiving, in response to the UE capability information request message, a UE capability information message indicating one or more antenna capabilities of the UE.

Aspect 11: The method of Aspect 10, wherein the UE capability information message indicates the one or more antenna capabilities on a per-band combination basis.

Aspect 12: The method of Aspect 10, wherein the UE capability information message indicates the one or more antenna capabilities on a per-band basis.

Aspect 13: The method of Aspect 10, wherein the UE capability information message indicates the one or more antenna capabilities on a per-component carrier basis.

Aspect 14: The method of any of Aspects 10-13, wherein the one or more antenna capabilities of the UE indicate one or more of: a quantity of physical antennas for transmission, a quantity of physical antennas for reception, a classification of an antenna as omnidirectional or directional, a polarization type of an antenna, an axial ratio for circular polarization, a main lobe beamwidth of an antenna, a directive gain of a main lobe of an antenna, a direction of a main lobe of an antenna, side lobe information for an antenna, a switching time between antennas, whether an antenna is steerable, or an effective isotropic radiated power (EIRP) of an antenna.

Aspect 15: The method of Aspect 14, wherein the side lobe information indicates one or more of: a quantity of side lobes, a beamwidth of a side lobe, a gain of a side lobe, or an orientation of a side lobe with respect to a main lobe.

Aspect 16: The method of any of Aspects 10-15, wherein the UE capability information message further indicates one or more antenna group capabilities of the UE.

Aspect 17: The method of Aspect 16, wherein the UE capability information message indicates the one or more antenna group capabilities on a per-antenna group basis.

Aspect 18: The method of any of Aspects 16-17, wherein the one or more antenna group capabilities of the UE indicate one or more of: a maximum quantity of transmission layers for an antenna group, or a codebook usage for an antenna group.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, configured to:

receive, from a network entity, a UE capability information request message; and transmit, to the network entity in response to the UE capability information request message, a UE capability information message indicating one or more antenna capabilities of the UE that indicate a classification of an antenna as omnidirectional or directional, a direction of a main lobe of the antenna, a quantity of side lobes for the antenna, a beamwidth of a side lobe, a gain of the side lobe, an orientation of the side lobe with respect to the main lobe, and whether the antenna is steerable.

2. The apparatus of claim 1, wherein the UE capability information message indicates the one or more antenna capabilities on a per-band combination basis.

3. The apparatus of claim 1, wherein the UE capability information message indicates the one or more antenna capabilities on a per-band basis.

4. The apparatus of claim 1, wherein the UE capability information message indicates the one or more antenna capabilities on a per-component carrier basis.

5. The apparatus of claim 1, wherein the one or more antenna capabilities of the UE indicate one or more of:

a quantity of physical antennas for transmission, a quantity of physical antennas for reception, a polarization type of an antenna, an axial ratio for circular polarization, a main lobe beamwidth of an antenna, a directive gain of a main lobe of an antenna, side lobe information for an antenna, a switching time between antennas, or an effective isotropic radiated power (EIRP) of an antenna.

6. The apparatus of claim 1, wherein the UE capability information message further indicates one or more antenna group capabilities of the UE.

7. The apparatus of claim 6, wherein the UE capability information message indicates the one or more antenna group capabilities on a per-antenna group basis.

8. The apparatus of claim 6, wherein the one or more antenna group capabilities of the UE indicate one or more of:

a maximum quantity of transmission layers for an antenna group, or a codebook usage for an antenna group.

9. An apparatus for wireless communication at a network entity, comprising:

one or more memories; and one or more processors, coupled to the one or more memories, configured to:

transmit a user equipment (UE) capability information request message for a UE; and receive, in response to the UE capability information request message, a UE capability information message indicating one or more antenna capabilities of the UE that indicate a classification of an antenna as omnidirectional or directional, a direction of a main lobe of the antenna, a quantity of side lobes for the antenna, a beamwidth of a side lobe, a gain of the side lobe, an orientation of the side lobe with respect to the main lobe, and whether the antenna is steerable.

10. The apparatus of claim 9, wherein the UE capability information message indicates the one or more antenna capabilities on a per-band combination basis.

11. The apparatus of claim 9, wherein the UE capability information message indicates the one or more antenna capabilities on a per-band basis.

12. The apparatus of claim 9, wherein the UE capability information message indicates the one or more antenna capabilities on a per-component carrier basis.

13. The apparatus of claim 9, wherein the one or more antenna capabilities of the UE indicate one or more of:

a quantity of physical antennas for transmission, a quantity of physical antennas for reception, a polarization type of an antenna, an axial ratio for circular polarization, a main lobe beamwidth of an antenna, a directive gain of a main lobe of an antenna, side lobe information for an antenna, a switching time between antennas, or an effective isotropic radiated power (EIRP) of an antenna.

14. The apparatus of claim 9, wherein the UE capability information message further indicates one or more antenna group capabilities of the UE.

15. The apparatus of claim 14,
wherein the UE capability information message indicates the one or more antenna group capabilities on a per-antenna group basis.

16. The apparatus of claim 14,
wherein the one or more antenna group capabilities of the UE indicate one or more of:
a maximum quantity of transmission layers for an antenna group, or
a codebook usage for an antenna group.

17. A method of wireless communication performed by an apparatus of a user equipment (UE), comprising:
receiving, from a network entity, a UE capability information request message; and
transmitting, to the network entity in response to the UE capability information request message, a UE capability information message indicating one or more antenna capabilities of the UE that indicate a classification of an antenna as omnidirectional or directional, a direction of a main lobe of the antenna, a quantity of side lobes for the antenna, a beamwidth of a side lobe, a gain of the side lobe, an orientation of the side lobe with respect to the main lobe, and whether the antenna is steerable.

18. The method of claim 17,
wherein the UE capability information message indicates the one or more antenna capabilities on a per-band combination basis.

19. The method of claim 17,
wherein the UE capability information message indicates the one or more antenna capabilities on a per-band basis.

20. The method of claim 17,
wherein the UE capability information message indicates the one or more antenna capabilities on a per-component carrier basis.

21. The method of claim 17,
wherein the one or more antenna capabilities of the UE indicate one or more of:
a quantity of physical antennas for transmission,
a quantity of physical antennas for reception,
a polarization type of an antenna,
an axial ratio for circular polarization,
a main lobe beamwidth of an antenna,
a directive gain of a main lobe of an antenna,
side lobe information for an antenna,
a switching time between antennas, or
an effective isotropic radiated power (EIRP) of an antenna.

22. The method of claim 17,
wherein the UE capability information message further indicates one or more antenna group capabilities of the UE.

23. The method of claim 22,
wherein the UE capability information message indicates the one or more antenna group capabilities on a per-antenna group basis.

24. The method of claim 22,
wherein the one or more antenna group capabilities of the UE indicate one or more of:
a maximum quantity of transmission layers for an antenna group, or
a codebook usage for an antenna group.

25. A method of wireless communication performed by an apparatus of a network entity, comprising:
transmitting a user equipment (UE) capability information request message for a UE; and
receiving, in response to the UE capability information request message, a UE capability information message indicating one or more antenna capabilities of the UE that indicate a classification of an antenna as omnidirectional or directional, a direction of a main lobe of the antenna, a quantity of side lobes for the antenna, a beamwidth of a side lobe, a gain of the side lobe, an orientation of the side lobe with respect to the main lobe, and whether the antenna is steerable.

26. The method of claim 25,
wherein the one or more antenna capabilities of the UE indicate one or more of:
a quantity of physical antennas for transmission,
a quantity of physical antennas for reception,
a polarization type of an antenna,
an axial ratio for circular polarization,
a main lobe beamwidth of an antenna,
a directive gain of a main lobe of an antenna,
side lobe information for an antenna,
a switching time between antennas,
or
an effective isotropic radiated power (EIRP) of an antenna.

27. The method of claim 25,
wherein the UE capability information message further indicates one or more antenna group capabilities of the UE.

28. The method of claim 27,
wherein the UE capability information message indicates the one or more antenna group capabilities on a per-antenna group basis.

29. The method of claim 25,
wherein the UE capability information message indicates the one or more antenna capabilities on a per-band combination basis.

30. The method of claim 25,
wherein the UE capability information message indicates the one or more antenna capabilities on a per-band basis.

* * * * *